(12) United States Patent
Peng et al.

(10) Patent No.: US 8,010,589 B2
(45) Date of Patent: Aug. 30, 2011

(54) SEMI-AUTOMATIC SYSTEM WITH AN ITERATIVE LEARNING METHOD FOR UNCOVERING THE LEADING INDICATORS IN BUSINESS PROCESSES

(75) Inventors: Wei Peng, Miami, FL (US); Philip C. Rose, Sodus, NY (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1227 days.

(21) Appl. No.: 11/676,816

(22) Filed: Feb. 20, 2007

(65) Prior Publication Data

US 2008/0201397 A1 Aug. 21, 2008

(51) Int. Cl.
- G06Q 10/00 (2006.01)
- G06F 11/30 (2006.01)
- G06F 15/02 (2006.01)
- G06F 13/00 (2006.01)
- G06F 3/00 (2006.01)
- G06F 17/15 (2006.01)
- G21C 17/00 (2006.01)

(52) U.S. Cl. ...... 708/422; 705/7.38; 705/7.39; 708/110; 708/134; 708/163; 702/182

(58) Field of Classification Search .......... 708/422–426; 705/7.39
See application file for complete search history.

(56) References Cited

U.S. PATENT DOCUMENTS

| | | | |
|---|---|---|---|
| 7,269,516 B2 * | 9/2007 | Brunner et al. | 702/19 |
| 7,519,994 B2 * | 4/2009 | Judge et al. | 726/22 |
| 7,675,948 B2 * | 3/2010 | Malomsoky et al. | 370/536 |
| 2002/0007273 A1 | 1/2002 | Chen | |
| 2003/0110396 A1 | 6/2003 | Lewis et al. | |
| 2004/0049387 A1 | 3/2004 | Jeong et al. | |
| 2004/0117226 A1 * | 6/2004 | Laiho et al. | 705/7 |
| 2004/0122672 A1 | 6/2004 | Bonastre | |
| 2006/0251130 A1 | 11/2006 | Greer et al. | |
| 2007/0028219 A1 * | 2/2007 | Miller et al. | 717/124 |
| 2008/0195431 A1 * | 8/2008 | Abe et al. | 705/7 |
| 2009/0076867 A1 * | 3/2009 | Eryaman | 705/7 |
| 2009/0304594 A1 * | 12/2009 | Fantin et al. | 424/9.2 |
| 2010/0082125 A1 * | 4/2010 | Pingel et al. | 700/47 |
| 2010/0082292 A1 * | 4/2010 | Pantaleano et al. | 702/182 |
| 2010/0138368 A1 * | 6/2010 | Stundner et al. | 706/12 |

(Continued)

OTHER PUBLICATIONS

Wei Peng, Tong Sun, Philip Rose, and Tao Li; "A semi-automatic system with an iterative learning method for discovering the leading indicators in business processes", In Proceedings of the 2007 international workshop on Domain driven data mining, ACM, pp. 33-42, 2007.*

(Continued)

*Primary Examiner* — Lewis Bullock, Jr.
*Assistant Examiner* — Matthew Sandifer
(74) *Attorney, Agent, or Firm* — Gibb I.P. Law Firm, LLC

(57) ABSTRACT

Embodiments herein select performance indicators from raw data and measure the indicators over at least one time period to extract a time series of data for each of the indicators. The method determines a time order among the correlated indicators and determines a causal direction among the correlated indicators based on which of the correlated indicators occurs first in time so as to identify relative leading indicators among the correlated indicators. The processes of determining the time order and determining the causal direction can comprise applying Dynamic Time Warping and/or Granger Causality techniques to the time series of data.

20 Claims, 6 Drawing Sheets

U.S. PATENT DOCUMENTS

2010/0219950 A1* 9/2010 Kong et al. .................. 340/540

OTHER PUBLICATIONS

Wei Peng, Tong Sun, Philip Rose, and Tao Li; "Computation and Applications of Industrial Leading Indicators to Business Process Improvement", International Journal of Intelligent Control and Systems, 2008.*

Steyvers M., "Multi-Dimensional Scaling", In Encyclopedia of Cognitive Science, Nature Publishing Group, London, 2002.

C. W. J. Granger. Investigating causal relations by econometric models and cross-spectral methods. Econometrica, 37:424-438, 1969.

John R. Freeman, "Granger Causality and the Time Series Analysis of Political Relationships", American Journal of Political Science, vol. 27, pp. 327-358, 1983.

Keogh et al., "Derivative Dynamic Time Warping", In Proc. of the First Intl. SIAm Intl. Conf. on Data Mining, Chicago, Illinois, 2001.

Wikipedia. Key performance indicators—wikipedia, the free encyclopedia, 2006. [Online; accessed Jul. 10, 2006].

W. W. Eckerson, "Performance dashboards: measuring, monitoring, and managing your business," John Wiley, Hoboken, NJ, 2005.

G. Young and A.S. Householder, "A note on multidimensional psycho-physical analysis," Psychometrika, 6:331-333, 1941.

* cited by examiner

FIG. 2
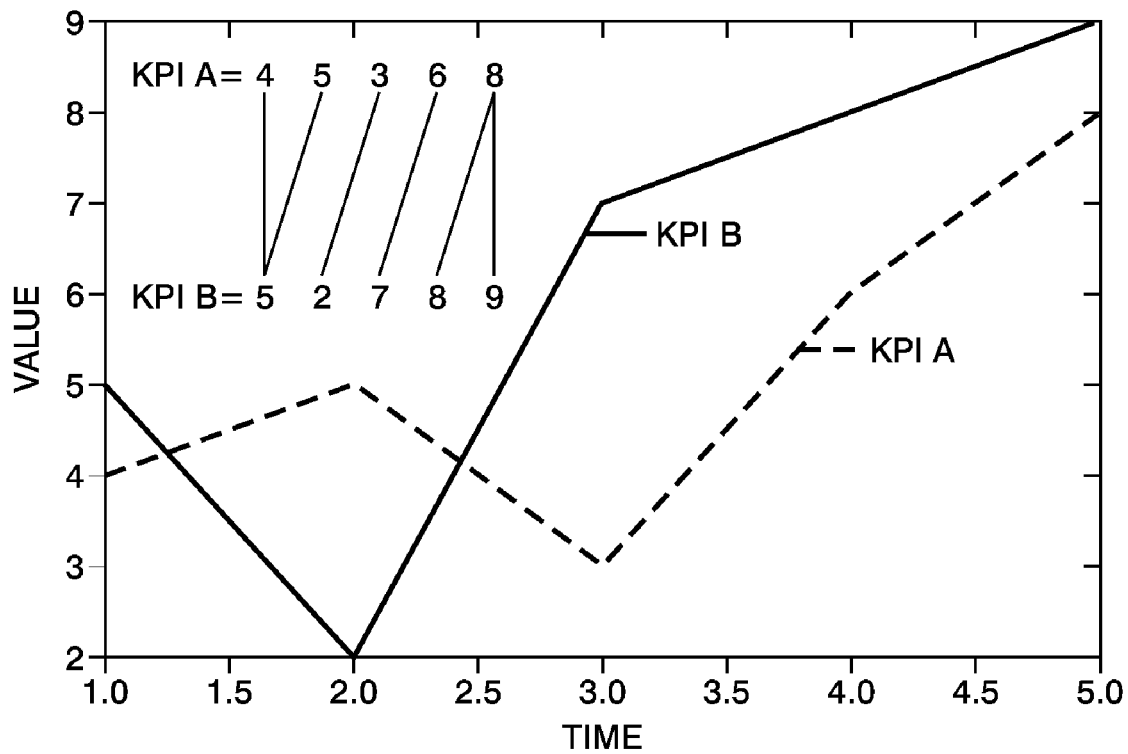
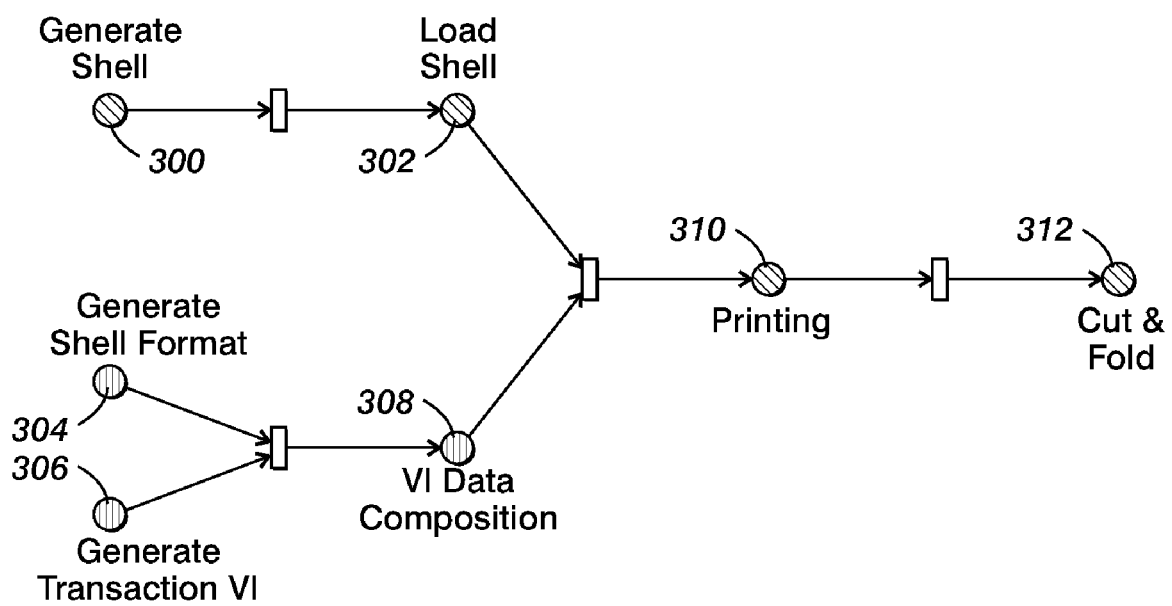
FIG. 3

FIG. 4
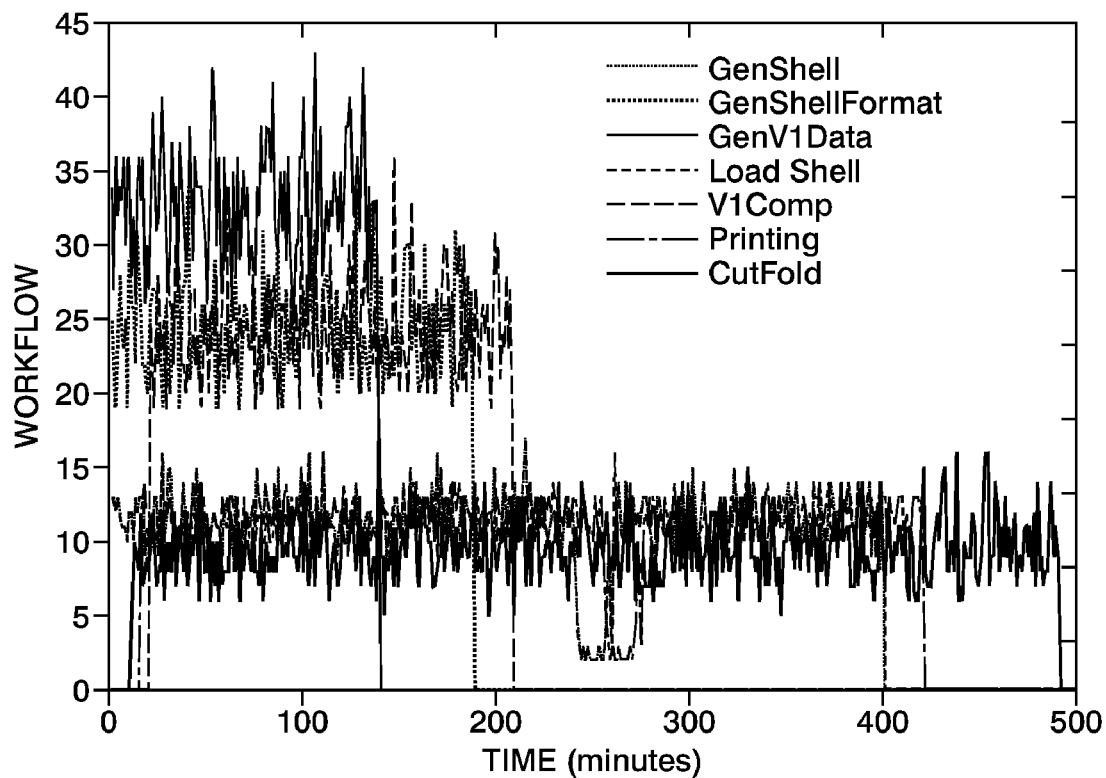
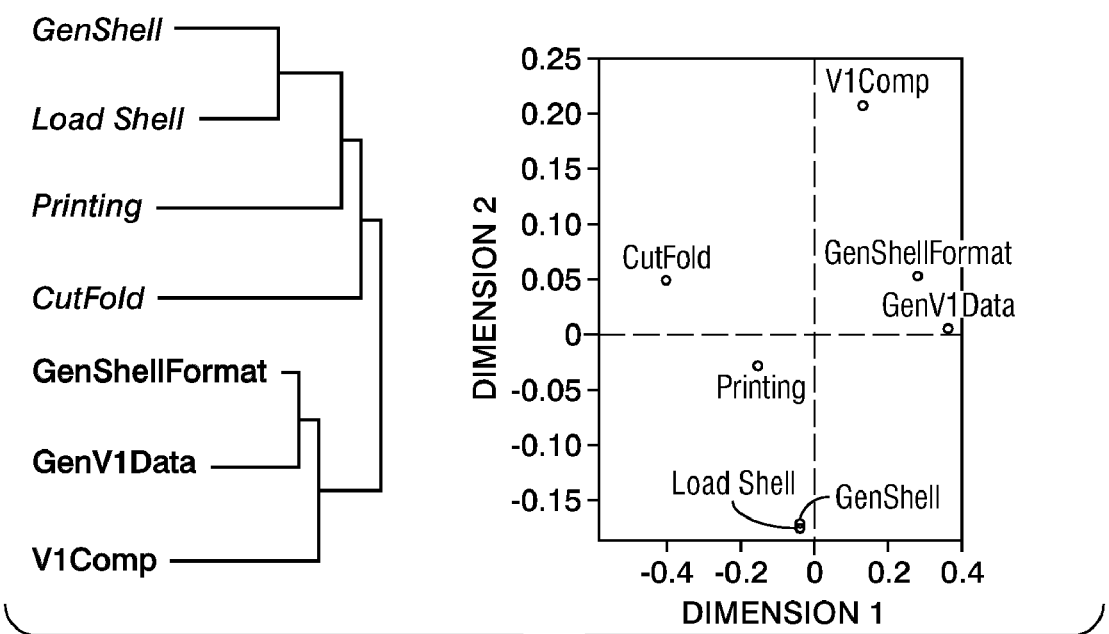
FIG. 5

SEMI-AUTOMATIC SYSTEM WITH AN ITERATIVE LEARNING METHOD FOR UNCOVERING THE LEADING INDICATORS IN BUSINESS PROCESSES

BACKGROUND

Embodiments herein generally relate to the use and manufacture of items, and more particularly, concerns a method, service, and computer program for identifying leading key performance indicators of the use and/or manufacture of any item, such as electrostatographic printers and copiers or reproduction machines. This method is useful beyond the printers, copiers, and reproduction machines. In fact, it is not surprising to find a leading indicator to a critical lagging indicator occurs in a completely different piece of machinery, department, or even region, as the machinery, department, region that helps define the lagging indicator. By way of example, in a print shop it would not be surprising to find that metrics in the sales department predict (i.e. lead) lagging key performance indicators in the printing, binding, and even shipping departments, and of any business or manufacturing process.

Key performance indicators (KPIs) signal the progress of organizational objectives [7] (note that references to publications are indicated by reference numbers herein, and a list of references appears at the end of this specification). Some key performance indicators such as the sales revenue, per unit manufacturing cost, machine utilization, customer satisfaction, customer churn, etc. are paid much attention for operational and business decision making. These are called Lagging indicators which have already happened and are of critical importance. Note that the embodiments discussed below are not limited to lagging indicators, but are applicable to any focal KPIs. In a traditional way, domain experts find what variables may cause or lead the variance of those lagging indicators using their domain knowledge. Such variables are called Leading Indicators. They are the indication and causal roots of focal lagging indicators, and are actionable for the future performance of those lagging indicators [2]. However, as business processes and manufacturing processes become more complex, relying only upon human judgment to find leading indicators of direct resource relocation and process modification is labor intensive and error-prone.

SUMMARY

Embodiments herein include a method of identifying leading indicators that defines data points from a workflow model (such as a printer/copier manufacturing or usage model, or any other model) to produce raw data of operations (e.g., printing operations). The embodiments select performance indicators (e.g., printing performance indicators) from the raw data and measure the indicators over at least one time period to extract a time series of data for each of the indicators. The methods filter out redundant indicators to produce a reduced indicator set of time series of data. This filtering process can comprise applying at least one unsupervised dimensionality technique to the times series of data. For example, the filtering can comprise applying at least one Principle Component Analysis and Singular Value Decomposition techniques to the times series of data.

Features of embodiments herein lie in a semi-automatic method that iteratively discovers leading indicators from real-time workflow logs and enables the incremental adjusting or adding of critical data collection points. Embodiments herein concern the entire process that connects embodied components, but not the individual technology in each component, as illustrated in FIG. 1.

The embodiments detect correlations among the time series of data within the reduced indicator set by considering time-shifts between the time series of data so as to identify correlated indicators. The method determines a time order among the correlated indicators and determines a causal direction among the correlated indicators based on which of the correlated indicators occurs first in time so as to identify relative leading indicators among the correlated indicators. However, if the correlated indicators occur at approximately the same time, the determining of the causal direction is based on a relative ability of each of the indicators to predict behavior of another of the correlated indicators. The processes of determining the time order and determining the causal direction can comprise applying Dynamic Time Warping and/or Granger Causality techniques to the time series of data.

The method then creates a similarity matrix among the correlated indicators based on the time order and how likely there is a causal relationship among the correlated indicators. The embodiments partition the correlated indicators within the similarity matrix into clusters using an agglomerative clustering process and identify the relative leading indicators within each cluster as root leading indicators of each of the clusters. This allows the embodiments to produce a report of the root leading indicators that can be evaluated by the user and the user can change the model, supply new business concerns, etc.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 2 is a diagram of an example of dynamic time warping on leading indicator identification;

FIG. 3 illustrates the beta printing workflow model of synthetic experimental data;

FIG. 4 illustrates simulated 7 times series KPIs;

FIG. 5 illustrates the dendrogram of agglomerative clustering on KPIs and visualization of KPIs;

DETAILED DESCRIPTION

Figure 1:
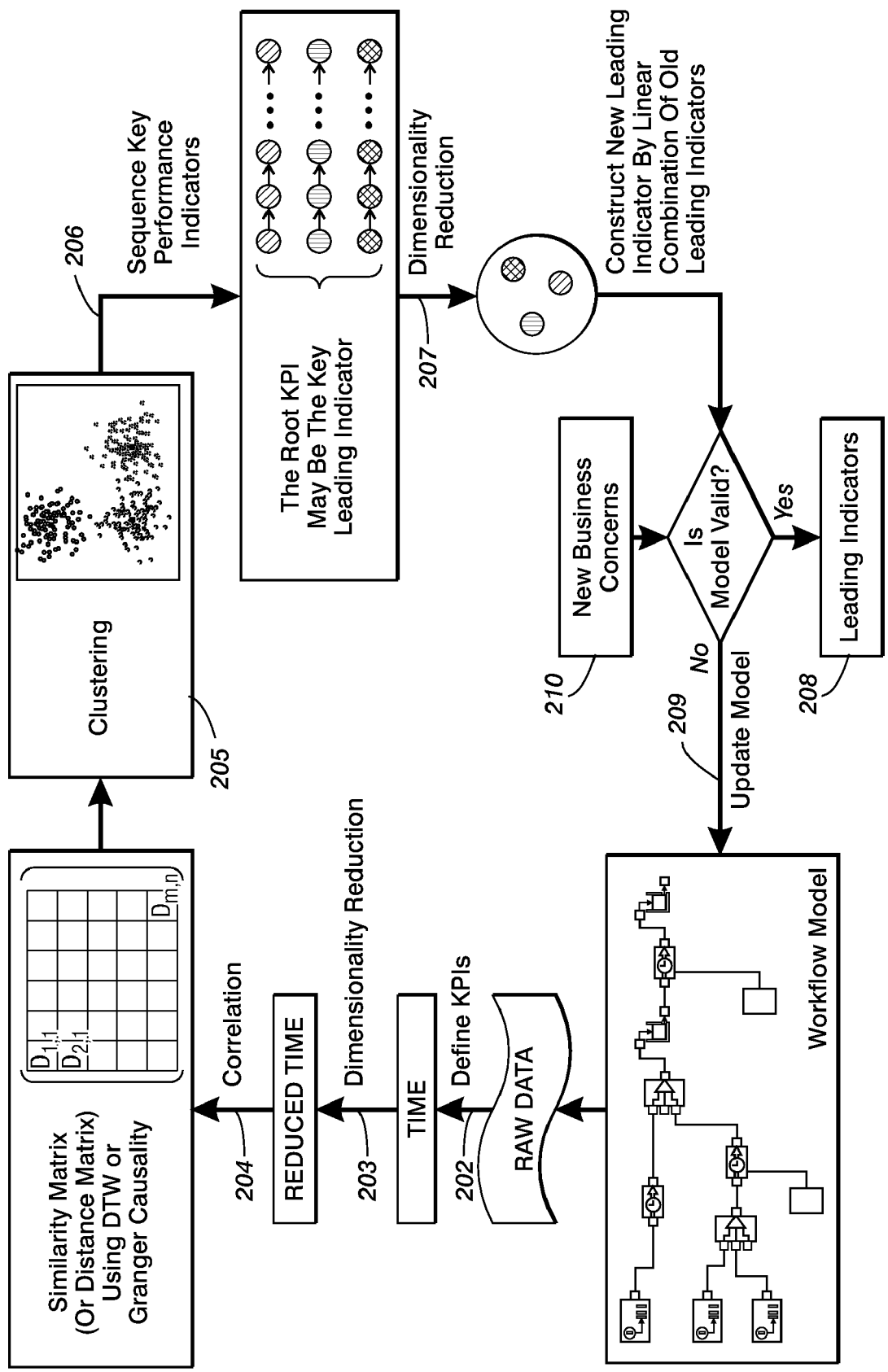
FIG. 1 is a flow diagram of a framework for leading indicator analysis.

In view of the foregoing, the embodiments herein provide a semi-automatic framework for analyzing, discovering, and identifying leading indicators by combining data mining techniques as well as the knowledge of domain experts.

In order to reduce the number of redundant KPIs, the embodiments herein use unsupervised dimensionality reduction techniques such as Principle Component Analysis (PCA) and Singular Value Decomposition (SVD) to remove the KPIs which have less information of the workflow system, if there are a large amount of KPIs to explore. In addition, an unsupervised dimensionality reduction technique, Piecewise Aggregate Approximation (PAA) can help to reduce the time dimensionality of each time series if the computational efficiency is required. Since in some examples herein the generated synthetic set of KPIs is not large, embodiments herein use agglomerative clustering based on Akaike Information Criterion (AIC) to simplify the problem that the overlapping KPIs are grouped together. Some root leading indicators are assigned to the corresponding clusters. This reduces the number of leading indicators, and identifies the root leading indicators to minimize the complexity for decision making.

Embodiments herein apply Dynamic Time Warping (DTW) [6] and Granger Causality [3, 4] to find the causal correlation between KPIs. Dynamic Time Warping is a non-metric distance function found by using dynamic programming. Dynamic Time Warping is often used in speech recognition. For example, see U.S. Patent Publications 2006/0251130, 20040122672, and 20040049387, the complete disclosures of which are incorporated herein by reference, for a detailed discussion of Dynamic Time Warping. Also see U.S. Patent Publications 2003/0110396 and 2003/0093004 the complete disclosures of which are incorporated herein by reference, for a detailed discussion of Granger Causality. In some examples, Dynamic Time Warping is able to compute the correlation between the leading indicators and KPIs they affect by considering different time shifts and speeds. In addition, the alignment warp path can be well utilized to provide the approximate time shift quantities. Granger Causality is an approach commonly applied to test the causal direction between economics time series variables [3, 4].

Granger Causality determines whether or not one time series variable can help to predict the other. Granger Causality usually conducts F-tests on the lagged time series values to test whether this time series variable provides significant information of the other [3, 4]. Granger Causality's advantages are establishing the solid statistical foundation for the leading indicator identification, and providing significance scores of causal relationships between pairs of KPIs that compensate for the drawbacks of DTW. The domain experts can take good advantages of both recommendations from DTW and Granger Causality to obtain more abundant information for the leading indicator judgment.

Embodiments herein can be supplied with or generate the raw data from the typical production printing workflow scenarios for testing the leading indicator analysis. Embodiments herein use adapted agglomerative clustering on the similarity matrices resulted from DTW or Granger Causality to construct the causal relation structure to help decision making, and discover the most critical root leading indicators. Though DTW and Granger Causality are both widely used techniques in speech recognition and economics respectively, they are not used in leading indicator analysis in the manufacturing and business intelligence.

FIG. 1 is a flow diagram that demonstrates one framework for leading indicator analysis according to embodiments herein. Embodiments herein provide a method of identifying leading indicators that defines data points from a workflow model (such as a printer/copier manufacturing or usage model) to produce raw data of operations (e.g., printing operations). More specifically, in item 202, the domain experts (human users) define KPIs which are time series data computed from raw data. Thus, the embodiments select performance indicators (e.g., printing performance indicators) from the raw data and measure the indicators over at least one time period to extract a time series of data for each of the indicators in item 202.

In item 203, dimensionality reduction techniques are applied to remove the redundant KPIs if, for example, the number of KPIs are very large. Thus, in item 203 the methods filter out redundant indicators to produce a reduced indicator set of time series of data. This filtering process can comprise applying at least one unsupervised dimensionality technique to the times series of data. For example, the filtering can comprise applying at least one Principle Component Analysis and Singular Value Decomposition techniques to the times series of data. Further, in item 203, the time dimensionality may need to be reduced if high computational efficiency is demanded.

Next, in item 204, a correlation (similarity) matrix which captures the relation between every pair of KPIs is calculated by using non-metric distance functions (DWT) and/or the economics measure Granger Causality. Thus, in item 204, the embodiments detect correlations among the time series of data within the reduced indicator set by considering time-shifts between the time series of data so as to identify correlated indicators. In item 204, the method determines a time order among the correlated indicators and determines a causal direction among the correlated indicators based on which of the correlated indicators occurs first in time (so as to identify relative leading indicators among the correlated indicators), as discussed in greater detail below. However, if the correlated indicators occur at approximately the same time, the determining of the causal direction is based on a relative ability of each of the indicators to predict behavior of another of the correlated indicators. The processes of determining the time order and determining the causal direction can comprise applying Dynamic Time Warping and/or Granger Causality techniques to the time series of data. In item 205, the method creates the similarity matrix among the correlated indicators based on the time order and the causal direction among the correlated indicators.

In item 205, the embodiments partition the correlated indicators within the similarity matrix into clusters using an agglomerative clustering process and identify the relative leading indicators within each cluster as root leading indicators of each of the clusters. Based on this matrix, adaptive agglomerative clustering puts highly correlated KPIs into the same cluster in item 205. For example, the number of cluster is chosen by AIC, which is one model of selection criteria. Some examples herein use AIC as an example as validation experiments for embodiments herein. The embodiments herein are able to construct the KPI hierarchy in item 206 based on the time shifts and the causal direction between the indicators.

Some root KPIs are key leading indicators. Not all root KPIs are leading indicators, but only the ones with enough time-warp distance can be "leading". However, leading indicators are root KPIs. Since decision making is usually not able to deal with too many root leading indicators, unsupervised dimensionality reduction performed in item 207 is one way to help build new leading indicators by linear combination. In another way, domain experts can pick more critical leading indicators depending on their knowledge.

Finally leading indicators drive decision making on the focal key lagging indicator optimization. This allows the embodiments to produce a report of the root leading indicators (item 208) that can be evaluated by the user and the user can change the model (item 209), supply new business concerns (item 210), etc. If the system does not obtain satisfactory results of leading indicators, or domain experts desire to collect more data, the whole leading indicator analysis process can be run again. In addition, the leading indicators tend to change or expire with time or workflow updates (item 209), thus the procedure of leading indicator analysis is iterative. The detailed description of some key techniques in this framework are presented below.

More specifically, with respect to item 204, the methods herein provide leading indicator identification based on DTW and Granger Causality. Leading indicators are different from diagnostic measures which show a very direct real-time relationship to the observed key lagging indicators in that they signal current health of processes or operational initiatives. Leading indicators are an indication and causal roots of focal lagging indicators, and are actionable for the future performance of those lagging indicators. Identifying leading indicators is tricky since the time shifts between the leading indicators and the corresponding affected lagging indicators are vague and may be random. For instance, the number of sales call next week may affect the revenue after two weeks to five weeks.

With respect to using Dynamic Time Warping to discover the correlation and the time order of KPIs, Dynamic Time Warping uses dynamic programming to replicate values multiple times to achieve the best alignment. The overall warping distance is based on a sum of local distances between elements. Since the local distance used herein is Euclidean Distance, and KPIs have different scales and ranges, before comparing time series KPIs using DTW embodiments herein normalize them using, for example, Z-score normalization. Z-score normalization is widely used to preprocess time series data. Z-score normalization can remove the baseline and re-scale the KPIs, and change the range of KPIs so that the preprocessed KPIs all have mean zero and variance one.

Suppose there are KPI X which has the value sequence $[X_1, X_2, \ldots, X_n]$, and KPI Y, $[Y_1, Y_2, \ldots, Y_m]$ along the time. The best warping distance DTW(X, Y) between X and Y is presented as follows:

$$DTW(X,Y) = D(X_n, Y_m) + \min\{DTW(X_{(1,n-1)}, Y_{(1,m-1)}), DTW(X_{(1,n-1)}, Y), DTW(X, Y_{(1,m-1)})\}, \quad (1)$$

where $D(X_n, Y_m)$ is the local distance between the elements $X_n$ and $Y_m$. $X_{(1,n-1)}$ and $Y_{(1,m-1)}$ are the subsequences $[X_1, X_2, \ldots, X_{n-1}]$ and $[Y_1, Y_2, \ldots, Y_{m-1}]$ respectively.

FIG. 2 shows a small example of dynamic time warping working on leading indicator identification. The graph includes a plot of the KPI A values shown below the graph (the plot line beginning at value 4) and a plot of the KPI B values shown below the graph (the plot line beginning at value 5). In this example, the warping distance between KPI A and KPI B is 4. This is shown in FIG. 2 as the sum of differences. For example, |4−5|+|5−5|+|3−2|+|6−7|+|8−8|+|8−9|=4.

If the warping distance between KPI A and KPI B is below the set threshold distance, they are considered to be highly correlated. For leading indicator identification based on DTW, it can be supposed that in two highly correlated KPIs, the one preceding the other is the leading indication of the other. Embodiments herein (item 204) use the alignment warp path to discover the time order in highly correlated KPIs and the approximate time shifts between them. The alignment warp path is composed of two arrays which are of the same length, each of which consists of the increasing or decreasing position numbers in a KPI. The elements of the same array number in the two arrays are matched positions by DTW to achieve the optimal alignment. Let the alignment warp path between KPI X and KPI Y be composed of arrays PX and PY from X and Y respectively. The time shift between X and Y is abs(mode(PX−PY)), where abs is the absolute value function. Mode is one of average methods. Mode(x) returns the element with the highest frequency in the array x. If X and Y are highly correlated, and if mode(PX−PY)<0, KPI X precedes Y, it is considered as the leading indicator of Y. If mode(PX−Y)>0, Y is the leading indicator. If mode(PX−PY)=0, X and Y are diagnostic measures of each other. For the example in FIG. 2, the alignment warp path is (1, 2, 3, 4, 5, 5) and (1, 1, 2, 3, 4, 5). The time shift between them is 1, and KPI B is preceding KPI A.

Granger Causality is a measure to determine whether one time series help to predict the other. Suppose you have lagged values of X and Y from time 1 to t−1, and you want to forecast the value of Y at time t. We say that X Granger-cause Y, if the variance of the optimal linear prediction based on lagged X and Y is smaller than only based on lagged Y. In another words, the addition of lagged X to lagged Y makes better prediction than only lagged Y. Granger Causality usually uses F-test on the lagged values of X and Y to test whether X provides significant information of the future values of Y. Let $Y_i$ and $X_i$ be the values of Y and X at time i respectively. The data are described by bivariate vector regressive model:

$$Y_t = \mu + \sum_{i=1}^{K} \alpha_i X_{t-i} + \sum_{i=1}^{k} \beta_i Y_{t-i} + \varepsilon_t, \quad (2)$$

where k is the lag length, $\alpha$ and $\beta$ are coefficients, and $\epsilon_t$ is the error term. The null hypothesis $H_0$ is $\alpha_1 = \alpha_2 = \ldots = \alpha_k = 0$. The equation 2 restricted under the null hypothesis is the model:

$$Y_t = \mu' + \sum_{i=1}^{K} \delta_i Y_{t-i} + \eta_t \quad (3)$$

The residues $Res_1$ and $Res_0$ of these two models are $\Sigma_{t=1}^{n} \epsilon_t^2$ and $\Sigma_{t=1}^{n} \eta_t^2$, where n is the whole test time. The sum of squares of residues in these two models can be transformed to a modified ratio which is:

$$TS = \frac{(Res_0 - Res_1)/k}{Res_1/(n-2k-1)} \sim F_{k, n-2k-1}. \quad (4)$$

TS called test statistic is following F-distribution if the null hypothesis is true. The value of test statistic is assigned a significance p-value which is in the range of [0, 1] by comparing to the corresponding entry in the table of F-test critical value. The smaller the significance score, the more possible it is to reject the null hypothesis, or to accept the causal relationship. For example, if F-test got a significance score 0.01 for KPI X Granger-causing KPI Y, embodiments herein suppose there is only one percent possibility that X does not Granger-cause Y. The significance score is directional. If significance score of X to Y is smaller enough while the significance score of Y to X is not, we regard X as the leading indication of Y. If the scores of two directions are very close, they are supposed to be diagnostic measures to each other.

The embodiments herein perform root leading indicator identification by using adaptive agglomerative clustering (item 205). Each KPI may have many leading indicators, and among these leading indicators some lead to the others. Thus, the KPIs and the leading relationships between them constitute a directional graph. The complexity of this graph is increased polynomially if the number of indicators is increasing. Domain experts are not able to examine all the leading indicators, and the decision making is impossible to disperse the energy on too many leading indicator optimization. One wants to reduce the complexity, and focus on the critical leading indicators. These critical leading indicators are called root leading indicators which are root causes of some KPIs.

Embodiments herein use adaptive agglomerative clustering (item 205) to discover the hierarchy of relationships between KPIs and the root leading indicators. From the results of DTW and Granger Causality, embodiments herein can derive the distance matrix (item 205) in which each cell is the value indicating the correlation between the corresponding row KPI and the column KPI, and the diagonal values are zeros. In case of DTW, the cell value is the alignment warping distance. In case of Granger Causality, since the significance scores are directional, one wants a little transformation to get the distance matrix. In the Granger Causality distance matrix, the cell value of row KPIi and column KPIj is equal to the cell value of row KPIj and column KPIi, and is equal to the smaller significance score in the scores from KPIi to KPIj and from j to i. After the distance matrix is derived, agglomerative clustering constructs a dendrogram on top of KPIs. KPIs are partitioned into clusters such that KPIs in the same cluster have a higher correlation between each other compared to the KPIs in other clusters.

The clusters are obtained by cutting the edges in the dendrogram constructed by the agglomerative clustering in item 205. However, how to cut the edges, or say, the number of clusters is not certain in the traditional agglomerative clustering, and even domain experts cannot determine the number of clusters in a complex set of KPIs. The modified agglomerative clustering of embodiments herein is able to solve this problem. More specifically in item 205, the cluster number can be determined by Akaike Information Criterion (AIC) which is one of model selection criteria. It is thought of as the log-likelihood penalized by the number of model parameters. The AIC score of a cluster assignment $C_i$ is defined as:

$$AIC(C_i) = 2L(C_i) - 2K \times m, \quad (5)$$

where $L(C_i)$ is the log-likelihood of $C_i$. $K \times m$ is the number of parameters in the model. K is the number of clusters. m is the number of coordinates of each KPI. We assume that each cluster is following multivariate Gaussian distribution. The log-likelihood $L(C_i)$ is:

$$L(C_i) = \sum_{i=1}^{K} \left[ -\frac{n_j}{2} \log(2\pi) - \frac{n_j/m}{2} \log(\sigma_j^2) - \frac{n_j - K}{2} + n_j/\log n_j - n_j/\log n \right], \quad (6)$$

where $n^j$ is the number of KPIs in cluster j. $\sigma^j$ is estimated by the average distance between all pairs of KPIs in cluster j. The cluster number which obtains the highest AIC score is chosen.

Because the KPIs in the same cluster are cohesive based on non-traditional correlation function, $\sigma^j$ is calculated using the warping distance matrix from DTW. Moreover, embodiments herein project KPIs into the two dimensional space where the traditional distance function preserves the property of the correlation obtained from DTW in the original space. The visualization of KPIs in this two dimensional space also helps to determine the number of clusters, and offers more direct sense of relationships between KPIs. Embodiments herein use multidimensional scaling (MDS) to create a space which faithfully captures the observed correlation between entities in this space [1, 8]. In some examples herein, MDS runs on the n×n pairwise distance matrix of n KPIs, and transforms it to n×2 matrix such that every KPI is projected into a 2 dimensional space. After embodiments herein obtain the clusters, each of the KPIs are sequenced based on the time order and shifts between them. The KPIs preceding all other KPIs in the cluster are thought as the root leading indicators of the other indicators in this cluster.

One example of the embodiments herein is a scenario of transaction printing of a dataset and KPI generation. In this example, the dataset is generated by discrete event simulation, although the embodiments herein are equally applicable to real world data. In this example, FIG. 3 illustrates the printing workflow model and shows how the leading indicator analysis helps guide decision making. Similarly, FIG. 4 illustrates 7 time series KPIs for the items in FIG. 3. More specifically, FIGS. 3 and 4 illustrate processes and time series for generating a shell 300, loading a shell 302, generating a shell format 304, generating transactions 306 (for data VI), performing data VI composition 308, printing 310 (based on the loaded shell and the data composition), and finally cutting and folding processes 312. Although a printing example is shown in FIG. 3, the embodiments herein are equally applicable to all disciplines that consider performance indicators.

The processing time for each item in each workflow component operation follows different Gaussian distributions. The flowing of items from one operation to another is delayed for some specified time, and some noises are added to the model. Embodiments herein configure the model such that the operator needs 20 minutes to transfer items from synchronized operations 'Generate Shell Format 300' and 'Generate VI Data 306' to operation 'VI Data Composition 308'. In this example, it takes 15 and 10 minutes for previous operation to 'Printing' and from 'Printing' to 'Cut&Fold' respectively. No transfer time exists between 'Generate Shell' and 'Load Shell'. Embodiments herein compute the above-mentioned seven KPIs which are throughput of all operations, as shown in FIG. 4. The KPIs in FIG. 4 are time series data tracking the throughput of each operation per minute for a total 500 minutes.

Next, with respect to the leading indicator identification, the KPIs are preprocessed using Z-score normalization. Then DTW and Granger Causality are applied (item 204) to obtain the optimal alignment warping distance matrix shown in Table 1, time shift matrix shown in Table 3, and causal significance matrix shown in Table 2.

TABLE 1

The alignment warping distance matrix obtained using DTW on simulated KPIs.

|  | GenShell | GenShellFormat | GenVIData | LoadShell | VIComp | Printing | CutFold |
|---|---|---|---|---|---|---|---|
| GenShell | 0 | 0.3753 | 0.3925 | 0.0036 | 0.4049 | 0.1417 | 0.5618 |
| GenShellFormat | 0.3753 | 0 | 0.0268 | 0.3780 | 0.0637 | 0.4179 | 0.8229 |
| GenVIData | 0.3925 | 0.0268 | 0 | 0.3952 | 0.1155 | 0.5128 | 0.9064 |
| LoadShell | 0.0036 | 0.3780 | 0.3952 | 0 | 0.4075 | 0.1425 | 0.5645 |
| VIComp | 0.4049 | 0.0637 | 0.1155 | 0.4075 | 0 | 0.3158 | 0.6395 |

TABLE 1-continued

The alignment warping distance matrix obtained using DTW on simulated KPIs.

|          | GenShell | GenShellFormat | GenVIData | LoadShell | VIComp | Printing | CutFold |
|----------|----------|----------------|-----------|-----------|--------|----------|---------|
| Printing | 0.1417   | 0.4179         | 0.5128    | 0.1425    | 0.3158 | 0        | 0.4064  |
| CutFold  | 0.5618   | 0.8229         | 0.9064    | 0.5645    | 0.6395 | 0.4064   | 0       |

TABLE 2

The causal relation significance matrix obtained using Granger Causality on simulated KPIs.

|                | GenShell | GenShellFormat | GenVIData | LoadShell | VIComp | Printing | CutFold |
|----------------|----------|----------------|-----------|-----------|--------|----------|---------|
| GenShell       | 0        | 0.7149         | 0.8384    | 0.0017    | 0.3511 | 0.0018   | 0.8569  |
| GenShellFormat | 0.9255   | 0              | 0.0244    | 0.9290    | 0.0952 | 0.6159   | 0.5046  |
| GenVIData      | 0.5882   | 0.0019         | 0         | 0.6920    | 0.0009 | 0.4435   | 0.6363  |
| LoadShell      | 0        | 0.4998         | 0.7863    | 0         | 0.4397 | 0.0020   | 0.7923  |
| VIComp         | 0.7044   | 0.0010         | 0.2922    | 0.7702    | 0      | 0.0756   | 0.2699  |
| Printing       | 0.1658   | 0.9082         | 0.9466    | 0.3713    | 0.6116 | 0        | 0.5674  |
| CutFold        | 0.9373   | 0.8367         | 0.6630    | 0.9624    | 0.2525 | 0.5886   | 0       |

TABLE 3

The time shift matrix obtained using DTW on simulated KPIs.

|                | GenShell | GenShellFormat | GenVIData | LoadShell | VIComp | Printing | CutFold |
|----------------|----------|----------------|-----------|-----------|--------|----------|---------|
| GenShell       | 0        | 129            | 0         | 0         | 109    | 16       | 27      |
| GenShellFormat | −129     | 0              | 0         | 120       | 20     | 0        | 372     |
| GenVIData      | 0        | 0              | 0         | 0         | 71     | 0        | 0       |
| LoadShell      | 0        | −120           | 0         | 0         | 109    | 15       | 36      |
| VIComp         | −109     | −20            | −71       | −109      | 0      | 0        | 171     |
| Printing       | −16      | 0              | 0         | −15       | 0      | 0        | 61      |
| CutFold        | −27      | −372           | 0         | −36       | −171   | −61      | 0       |

As shown in the tables, GenShell, GenShellFormat, GenVIData, LoadShell, VIComp, Printing, and CutFold in these tables are seven KPIs corresponding to the time series in FIGS. 3 and 4. They are the throughput of operations 'Generate Shell', 'Generate Shell Format', 'Generate VI Data', 'Load Shell', 'VI Data Composition', 'Printing', and 'Cut-Fold' respectively. The cell value in Table 1 represents the optimal warping distance between the corresponding column KPI and the corresponding row KPI. Thus, the smaller the cell value, the more possibly the corresponding column KPI is highly correlated with the corresponding row KPI. The significance score of KPI i Granger-causing KPI j is filled in the cell of row i and column j in Table 2. The smaller the significance score, the more causal relationship exists between the corresponding row KPI and column KPI. The time shift matrix in Table 3 is calculated from the alignment warp path. The positive cell value means that the row KPI appears before the column KPI, vice verse. Zeros in cells indicate diagnostic relationship. From these three tables, it can be seen that GenShell is highly correlated to LoadShell. This is because the corresponding operations are directly connected in the workflow model. The time shift between them is calculated out to be zero in Table 3. Granger Causality shows that GenShell and LoadShell are the diagnostic measure to each other since the values in the corresponding cells in Table 2 are small enough and very close to each other. Printing is highly correlated with GenShell and LoadShell. Further, the time shift matrix also indicates that loadShell affects Printing after 15 minutes. GenShellFormat affects VIComp after 20 minutes. Note that these exactly correspond to the transfer times previously mentioned. We find that the reason why Printing is affected by GenShell and LoadShell is that the processing rate of GenShell and LoadShell is lower than the processing rate of GenShellFormat, GenVIData, and VIComp. Thus, to optimize the throughput of Printing, embodiments herein should increase the throughput of Generate Shell and Load Shell. For the same reason, the throughput of VI data composition can be improved by increasing the processing rate of Generate Shell Format. These results are helpful for domain experts to make decision on some objective KPI optimization, especially in a complex system.

As mentioned previously, in item 205, the embodiments herein perform adaptive agglomerative clustering on the KPIs. The dendrogram of agglomerative clustering on the alignment warping distance matrix with respect to this example is shown on the left in FIG. 5. More specifically, FIG. 5 shows the clustering procedure for the previously mentioned seven time series KPIs (discussed above with respect to FIGS. 3 and 4), and can be used to construct clusters by cutting edges. The visualization of KPIs by using MDS is shown in the right of FIG. 5. AIC scores for different clustering assignment are calculated. The score is maximal when the KPIs are divided into two clusters. Embodiments herein can observe these two clusters in the MDS visualization shown in FIG. 5.

The KPIs in the same cluster are identified similarly in FIGS. 3 and 5. One cluster has GenShell, LoadShell, Printing, and CutFold. The other has GenShellFormat, GenVIData, and VIComp. In the former cluster, the root leading indicator is GenShell and LoadShell as the results of DTW and Granger Causality. In the latter cluster, the root leading indicator is GenShellFormat. If the focal lagging indicator is the finishing throughput of the beta printing. The finishing throughput is the throughput of the operation 'CutFold'. After domain experts (users) examine the results obtained from leading indicator analysis, they could decide to increase the processing rate of the operation 'Generate Shell' to optimize the finishing throughput. In this example, the time that this leading indicator affects the finishing throughput is approximately 25 minutes.

Figure 6:
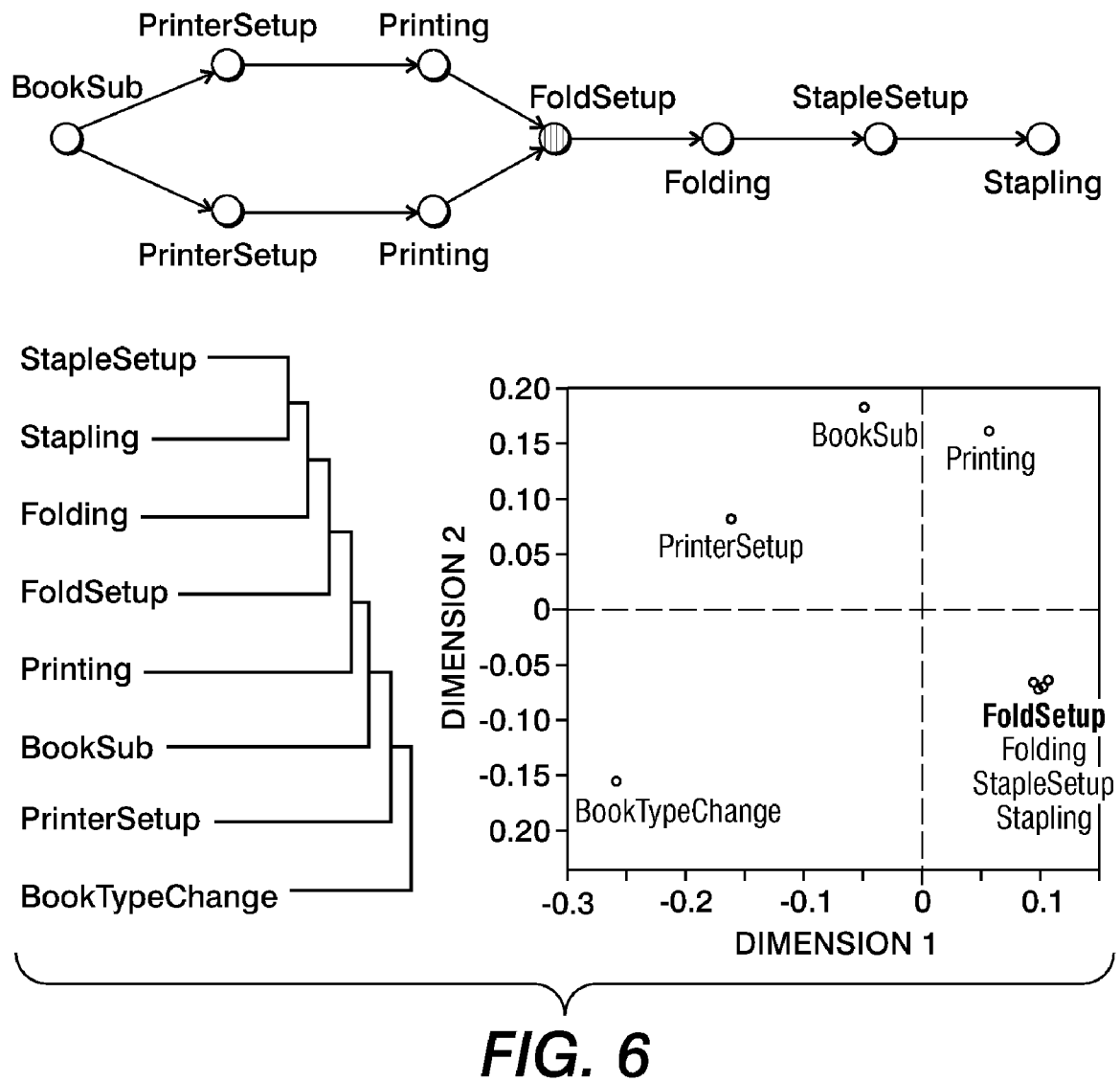
FIG. 6 illustrates the evolving procedure of book printing for leading indicator analysis.
Figure 7:
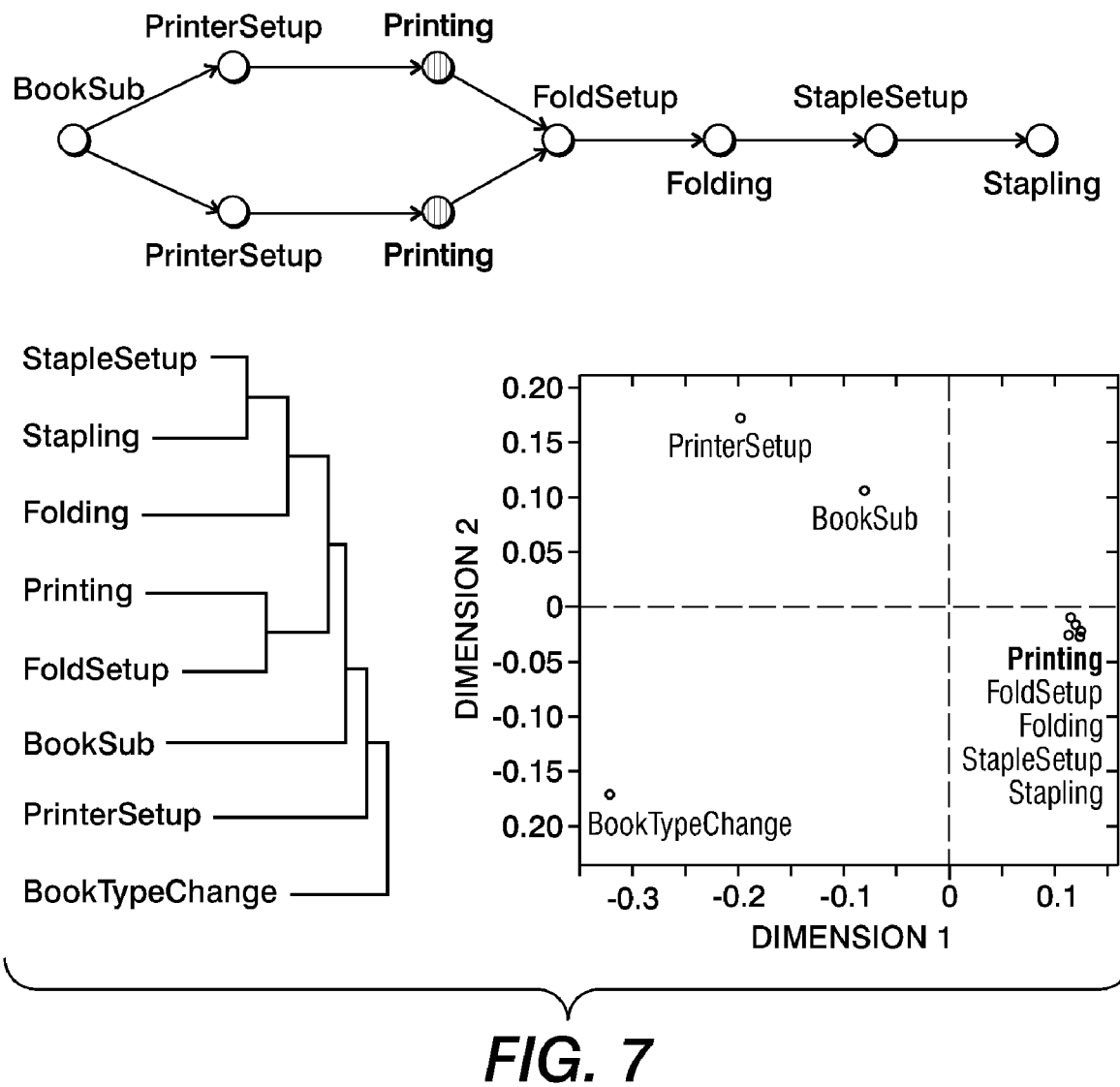
FIG. 7 illustrates the evolving procedure of book printing for leading indicator analysis.
Figure 8:
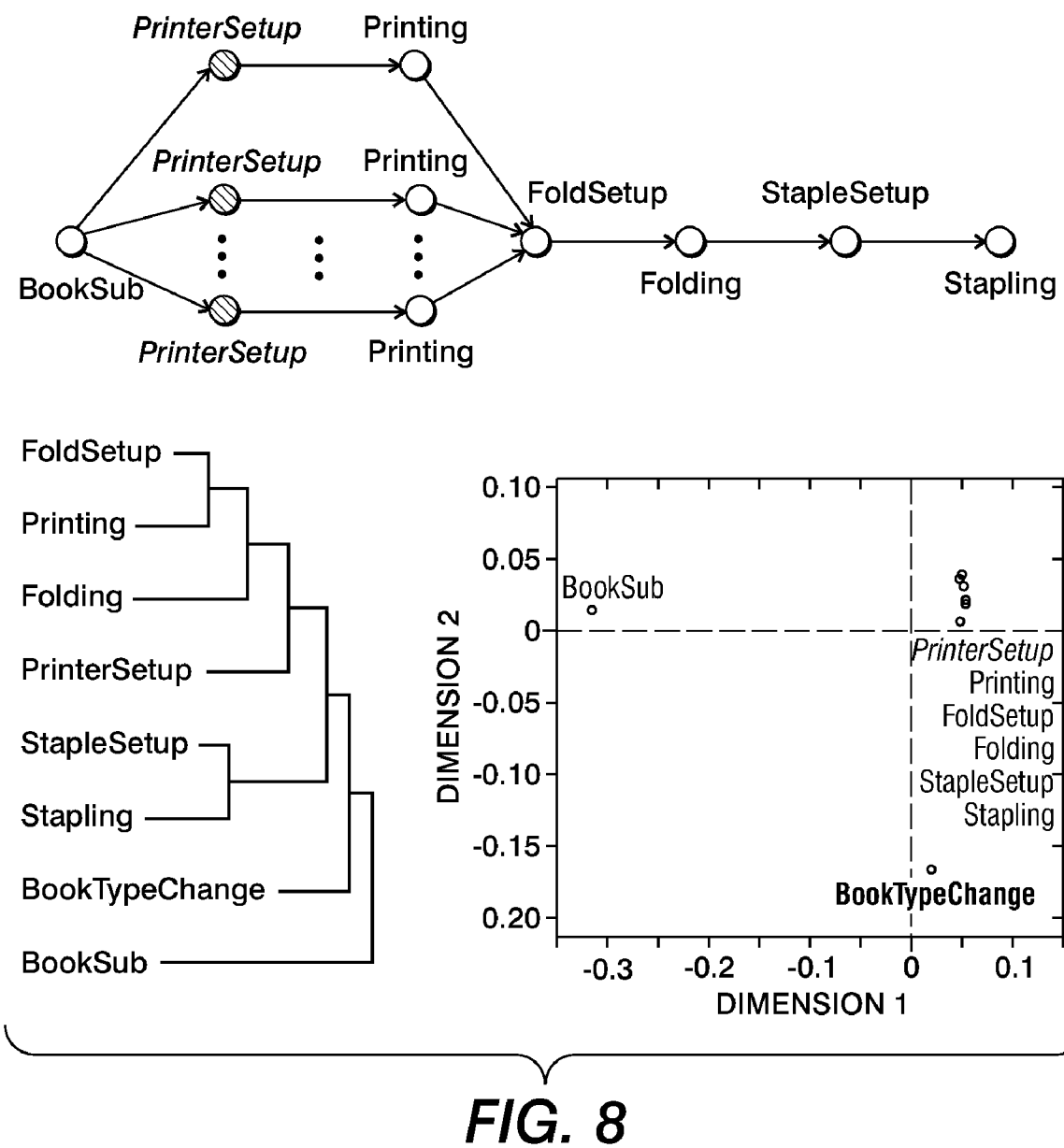
FIG. 8 illustrates the evolving procedure of book printing for leading indicator analysis.

FIG. 6-8 illustrate an example of using embodiments herein with an evolving procedure of leading indicator analysis for book printing dataset and KPI generation. As mentioned above, printing is used herein only as an example and the embodiments herein are not limited to printing, but are applicable to all endeavors. The example shown flowing through FIG. 6-8 is similar to the example discussed above with respect to FIG. 5 and each of FIGS. 6-8 illustrate a printing workflow model along the top of each figure, with a dendrogram of agglomerative clustering on the alignment warping distance matrix shown to the left below each printing workflow model and a visualization of KPIs by using MDS shown to the right below each printing workflow model. In this example, the whole dataset contains three evolving phases of book printing. There are 8 KPIs such as 'Book Submission Rate' (BookSub), thoughputs of 'Printer Setup' (PrintSetup), 'Printing', 'Folder Setup' (FoldSetup), 'Folding', 'Staple Setup' (StapleSetup), 'Stapling', and 'Book Type Changing Rate' (BookTypeChange).

More specifically, FIGS. 6-8 illustrate the evolving leading indicator analysis. In this example, book printing needs to go through book submission, printer setup when the paper size or quality is changed, printing, folder setup, folding, staple setup, and stapling. Folder setup and staple setup are assumed to be required for all books. However, printer setup depends on whether the type has changed from a previous book to the current book being produced. If both the previous book and current book have the same paper quality, and the same color requirement, etc, the printer does not need to be set up. Otherwise, a certain amount of time is consumed for printer setup. The processing time for all the operations depends on the volumes of books and their typical running speed.

FIG. 6 illustrate a scenario where the folder setup is incorrect and where the user changes the model (item 209) in FIG. 1) to cure this error. This may due to the operator inefficiency or the folder error. KPIs are divided into 5 clusters according to AIC score as shown in the MDS visualization. The folder setup throughput is the root leading indicator of the finishing throughput (stapling throughput). In response to this need shown in FIG. 6, in FIG. 7 the folder setup is fixed to meet the book printing demand. With the modified arrangement in FIG. 7, the KPIs are grouped into 4 clusters. The printing throughput thus becomes the root leading indicator of the finishing throughput. This situation shown in FIG. 7 demonstrates that the number of printers needs to be increased, or that higher speed printers are needed. In FIG. 8, in response to the needs shown in FIG. 7, more printers are added into the book printing process. This may represent a situation where the types of books are getting more various as the customers require more customized books. In this example, there are 5 book types compared to the previous 2 types, KPIs are divided into 3 clusters, and the printer setup throughput is the root leading indicator of the finishing throughput. Note that clustering based on the distance matrix of DTW is not able to find a more critical leading indicator BookTypeChange. However, the causal significant matrix obtained from Granger causality indicates that BookTypeChange is the root leading indicator of all other KPIs except BookSub. Then the domain experts can decide to improve the printer setup, or make better arrangement of books to different printers. For example, the same type of books can be scheduled together to the same printer. We note that Granger causality is supplementary to help find hidden leading indicators when the time shift obtained from DTW between some KPIs are not very obvious.

Therefore, as shown above, embodiments herein include a method of identifying leading indicators that defines data points from a workflow model to produce raw data of operations. The embodiments select performance indicators from the raw data and measure the indicators over at least one time period to extract a time series of data for each of the indicators. The methods filter out redundant indicators to produce a reduced indicator set of time series of data. This filtering process can comprise applying at least one unsupervised dimensionality technique to the times series of data.

The embodiments detect correlations among the time series of data within the reduced indicator set by considering time-shifts between the time series of data so as to identify correlated indicators. The method determines a time order among the correlated indicators and determines a causal direction among the correlated indicators based on which of the correlated indicators occurs first in time so as to identify relative leading indicators among the correlated indicators. However, if the correlated indicators occur at approximately the same time, the determining of the causal direction is based on a relative ability of each of the indicators to predict behavior of another of the correlated indicators. The processes of determining the time order and determining the causal direction can comprise applying Dynamic Time Warping and/or Granger Causality techniques to the time series of data.

The method then creates a similarity matrix among the correlated indicators based on the time order and the causal direction among the correlated indicators. The embodiments partition the correlated indicators within the similarity matrix into clusters using an agglomerative clustering process and identify the relative leading indicators within each cluster as root leading indicators of each of the clusters. This allows the embodiments to produce a report of the root leading indicators that can be evaluated by the user and the user can change the model, supply new business concerns, etc.

The word "printer" or as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

REFERENCES

[1] Steyvers M., "Multi-Dimensional Scaling", In Encyclopedia of Cognitive Science, Nature Publishing Group, London, 2002.

[2] W. W. Eckerson. *Performance dashboards: measuring, monitoring, and managing your business*. John Wiley, Hoboken, N.J., 2005.

[3] C. W. J. Granger. Investigating causal relations by econometric models and cross-spectral methods. *Econometrica*, 37:424-438, 1969.

[4] John R. Freeman, "Granger Causality and the Time Series Analysis of Political Relationships", American Journal of Political Science, Vol. 27, pp. 327-358, 1983.

[6] Keogh et al., "Derivative Dynamic Time Warping", In Proc. Of the First Intl. SIAm Intl. Conf. on Data Mining, Chicago, Ill., 2001.

[7] Wikipedia. Key performance indicators—wikipedia, the free encyclopedia, 2006. [Online; accessed 10 Jul. 2006].

[8] G. Young and A. S. Householder. A note on multidimensional psycho-physical analysis. *Psychometrika*, 6:331-333, 1941.

What is claimed is:

1. A computer-implemented method comprising:
    defining, by a computer, data points from a model;
    producing raw data of production operations corresponding to said data points, said raw data being produced by production machines used in said production operations;
    computing, by said computer, performance indicators from said raw data;
    measuring, by said computer, said indicators over at least one time period to extract a time series of data for each of said indicators;
    filtering out, by said computer, redundant indicators to produce a reduced indicator set of time series of data;
    detecting, by said computer, correlations among said time series of data within said reduced indicator set by considering time-shifts between said time series of data so as to identify correlated indicators;
    determining, by said computer, a time order among said correlated indicators;
    determining, by said computer, a causal direction among said correlated indicators so as to identify relative leading indicators among said correlated indicators;
    creating, by said computer, a similarity matrix among said correlated indicators based on said time order and said causal direction among said correlated indicators;
    partitioning, by said computer, said correlated indicators within said similarity matrix into clusters using an agglomerative clustering process;
    identifying, by said computer, said relative leading indicators within each cluster as root leading indicators of a each of said clusters; and
    producing, by said computer, a report of said root leading indicators of said production operations.

2. The method according to claim 1, wherein said filtering comprises applying at least one unsupervised dimensionality technique to said times series of data.

3. The method according to claim 1, wherein said filtering comprises applying at least one Principle Component Analysis and Singular Value Decomposition techniques to said times series of data.

4. The method according to claim 1, wherein said determining of said time order and said determining of said causal direction comprise applying a Dynamic Time Warping technique to said time series of data.

5. The method according to claim 1, wherein said determining of said time order and said determining of said causal direction comprise applying Dynamic Time Warping and Granger Causality techniques to said time series of data.

6. The method according to claim 1, wherein said determining of said causal direction comprises applying a Granger Causality technique to said time series of data.

7. A computer-implemented method comprising:
    defining, by a computer, data points from a model;
    producing raw data of production operations corresponding to said data points, said raw data being produced by production machines used in said production operations;
    computing, by said computer, performance indicators from said raw data;
    measuring, by said computer, said indicators over at least one time period to extract a time series of data for each of said indicators;
    filtering out, by said computer, redundant indicators to produce a reduced indicator set of time series of data;
    detecting, by said computer, correlations among said time series of data within said reduced indicator set by considering time-shifts between said time series of data so as to identify correlated indicators;
    determining, by said computer, a time order among said correlated indicators;
    determining, by said computer, a causal direction among said correlated indicators based on which of said correlated indicators occurs first in time so as to identify relative leading indicators among said correlated indicators;
    creating, by said computer, a similarity matrix among said correlated indicators based on said time order and said causal direction among said correlated indicators;
    partitioning, by said computer, said correlated indicators within said similarity matrix into clusters using an agglomerative clustering process;
    identifying, by said computer, said relative leading indicators within each cluster as root leading indicators of a each of said clusters; and
    producing, by said computer, a report of said root leading indicators of said production operations.

8. The method according to claim 7, wherein said filtering comprises applying at least one unsupervised dimensionality technique to said times series of data.

9. The method according to claim 7, wherein said filtering comprises applying at least one Principle Component Analysis and Singular Value Decomposition techniques to said times series of data.

10. The method according to claim 7, wherein said determining of said time order and said determining of said causal direction comprise applying a Dynamic Time Warping technique to said time series of data.

11. The method according to claim 7, wherein said determining of said time order and said determining of said causal direction comprise applying Dynamic Time Warping and Granger Causality techniques to said time series of data.

12. The method according to claim 7, wherein said determining of said causal direction comprises applying a Granger Causality technique to said time series of data.

13. A computer-implemented method comprising:
    defining, by a computer, data points from a model;
    producing raw data of printing operations corresponding to said data points, said raw data being produced by printing machines used in said printing operations;
    computing, by said computer, performance indicators from said raw data;

measuring, by said computer, said indicators over at least one time period to extract a time series of data for each of said indicators;

filtering out, by said computer, redundant indicators to produce a reduced indicator set of time series of data;

detecting, by said computer, correlations among said time series of data within said reduced indicator set by considering time-shifts between said time series of data so as to identify correlated indicators;

determining, by said computer, a time order among said correlated indicators;

determining, by said computer, a causal direction among said correlated indicators based on a relative ability of each of said indicators to predict behavior of another of said correlated indicators so as to identify relative leading indicators among said correlated indicators;

creating, by said computer, a similarity matrix among said correlated indicators based on said time order and said causal direction among said correlated indicators;

partitioning, by said computer, said correlated indicators within said similarity matrix into clusters using an agglomerative clustering process;

identifying, by said computer, said relative leading indicators within each cluster as root leading indicators of a each of said clusters; and producing, by said computer, a report of said root leading indicators of said printing operations.

14. The method according to claim 13, wherein said filtering comprises applying at least one unsupervised dimensionality technique to said times series of data.

15. The method according to claim 13, wherein said filtering comprises applying at least one Principle Component Analysis and Singular Value Decomposition techniques to said times series of data.

16. The method according to claim 13, wherein said determining of said time order and said determining of said causal direction comprise applying a Dynamic Time Warping technique to said time series of data.

17. The method according to claim 13, wherein said determining of said time order and said determining of said causal direction comprise applying Dynamic Time Warping and Granger Causality techniques to said time series of data.

18. The method according to claim 13, wherein said determining of said causal direction comprises applying a Granger Causality technique to said time series of data.

19. A computer-implemented method comprising:

defining, by a computer, data points from a model;

producing raw data of production operations corresponding to said data points, said raw data being produced by production machines used in said production operations;

computing, by said computer, performance indicators from said raw data;

measuring, by said computer, said indicators over at least one time period to extract a time series of data for each of said indicators;

filtering out, by said computer, redundant indicators to produce a reduced indicator set of time series of data;

detecting, by said computer, correlations among said time series of data within said reduced indicator set by considering time-shifts between said time series of data so as to identify correlated indicators;

determining, by said computer, a time order among said correlated indicators;

determining, by said computer, a causal direction among said correlated indicators based on which of said correlated indicators occurs first in time so as to identify relative leading indicators among said correlated indicators, wherein if said correlated indicators occur at approximately a same time, said determining of said causal direction is based on a relative ability of each of said indicators to predict behavior of another of said correlated indicators;

creating, by said computer, a similarity matrix among said correlated indicators based on said time order and said causal direction among said correlated indicators;

partitioning, by said computer, said correlated indicators within said similarity matrix into clusters using an agglomerative clustering process;

identifying, by said computer, said relative leading indicators within each cluster as root leading indicators of a each of said clusters; and producing, by said computer, a report of said root leading indicators of said production operations.

20. A non-transitory computer readable storage medium storing instructions that, when executed by a computer, cause the computer to perform a method comprising:

defining, by a computer, data points from a model;

producing raw data of production operations corresponding to said data points, said raw data being produced by production machines used in said production operations;

computing performance indicators from said raw data;

measuring said indicators over at least one time period to extract a time series of data for each of said indicators;

filtering out redundant indicators to produce a reduced indicator set of time series of data;

detecting correlations among said time series of data within said reduced indicator set by considering time-shifts between said time series of data so as to identify correlated indicators;

determining a time order among said correlated indicators;

determining a causal direction among said correlated indicators so as to identify relative leading indicators among said correlated indicators;

creating a similarity matrix among said correlated indicators based on said time order and said causal direction among said correlated indicators;

partitioning said correlated indicators within said similarity matrix into clusters using an agglomerative clustering process;

identifying said relative leading indicators within each cluster as root leading indicators of a each of said clusters; and producing a report of said root leading indicators of said production operations.

* * * * *